United States Patent
Neal et al.

[15] 3,658,149
[45] Apr. 25, 1972

[54] OVAL-FLEXING SEISMIC SOURCE

[72] Inventors: William J. Neal, Manvel; Jacob C. Richardson, Houston; Thomas F. Vining, Houston, all of Tex.

[73] Assignee: Shell Oil Company, New York, N.Y.

[22] Filed: Sept. 18, 1968

[21] Appl. No.: 760,461

[52] U.S. Cl. .................................................. 181/0.5 NC
[51] Int. Cl. ............................................................ G01v 1/02
[58] Field of Search .............................................. 181/0.5 NC

[56] References Cited

UNITED STATES PATENTS 3,176,787  4/1965  Roever ........................................ 340/7
3,480,101  11/1969  Barry et al. .............................. 181/0.5
3,601,217  8/1971  Thigpen et al. .......................... 181/0.5

Primary Examiner—Rodney D. Bennett, Jr.
Assistant Examiner—N. Moskowitz
Attorney—Theodore E. Bieber and J. H. McCarthy

[57] ABSTRACT

A seismic source wherein an explosive gas mixture is detonated within a closed chamber having a flexible wall in contact with a body of liquid. When the gas mixture is detonated, the flexible wall expands and displaces the adjacent liquid. Subsequently, before the flexible wall collapses, the chamber is opened to an exhaust conduit, and after a time delay the chamber is opened to a vacuum source. The vacuum completes the scavenging of the chamber, and it is then ready for the next cycle.

8 Claims, 4 Drawing Figures

PATENTED APR 25 1972  3,658,149

INVENTORS:
W. J. NEAL
J. C. RICHARDSON
T. F. VINING
BY: *J. E. Bieber*
THEIR ATTORNEY

INVENTORS:
W. J. NEAL
J. C. RICHARDSON
T. F. VINING

BY: J. E. Bieber
THEIR ATTORNEY

INVENTORS:
W. J. NEAL
J. C. RICHARDSON
T. F. VINING

3,658,149

OVAL-FLEXING SEISMIC SOURCE

RELATED PATENTS

The present invention is an improvement over the seismic source described and claimed in U.S. Pat. No. 3,176,787.

BACKGROUND OF THE INVENTION

The present invention relates to seismic sources, and more particularly, to a seismic source for use in water-covered areas. While the source is designed primarily for conducting seismic surveys over water-covered areas such as offshore or in bays, rivers, and marshes, it can also be used to conduct a land survey if a liquid-filled trench is provided for enclosing the sound source.

The above-referenced patent describes a seismic sound source for use in water-covered areas wherein an explosive gas is supplied to an elongated, flexible tube. The gas is detonated within the tube and the tube exhausted and refilled with a new charge of explosive gas. Further, the patent describes the need for providing a means by which the tube may readily expand to at least five times its original cross sectional area. This degree of expansion is necessary to insure a long tube life and limit the amount of energy that is expended in expanding the tube.

While the system described in the patent has operated satisfactorily, several problems have arisen, particularly in the exhausting of the combustion products from the flexible tube after the explosive gas has been detonated. For example, if the tube is merely exhausted to the atmosphere through an exhaust line having a check valve, there will be an incomplete scavenging of the exhaust tube. Also, at times, raw gas may be drawn into the exhaust tube and result in explosions in the exhaust tube when the check valve opens. This, of course, will destroy the exhaust tube, as it is normally not constructed to withstand the detonation of gases therein.

If a valve were installed in place of the check valve to control the exhausting of the flexible tube, the flexible tube will eventually fill with contaminated gas, reducing the magnitude of the explosions. This results from the inability of the incoming gas to completely scavenge the flexible tube of all the combustion products of the previous explosion.

In an attempt to overcome the above difficulties, it was suggested that the exhaust could be coupled to a vacuum pump and a valve positioned in the exhaust line to open it after the detonation of the gas mixture. While this provides a means for completely scavenging the flexible tube of the combustion products, the valve must remain tight to prevent the drawing of raw gas into the vacuum pump. If the valve fails, the vacuum pump will draw the raw gas from the flexible chamber into the vacuum pump and cause serious damage to the pump when it explodes.

SUMMARY OF THE INVENTION

The present invention solves the above problems by coupling the flexible tube to an outlet manifold containing both an exhaust line and a line that leads to an evacuated container. The manifold also contains a power valve that is operated by the detonation of the gas mixture with the power valve controlling the opening of valves in the exhaust line and the vacuum line. More particularly, the power valve responds to the arrival of pressure waves from the detonation to open the flexible tube to the manifold structure. The exhaust line is controlled by a check valve that is opened when the power valve opens. The exhaust valve remains open until the tube has expanded outwardly to substantially its final diameter. At this point the pressure in the flexible tube will be reduced to a relatively low value and the exhaust valve will close.

The opening of the valve in the vacuum line is delayed until the flexible tube is expanded almost to its final diameter. The valve in the vacuum line is then opened and remains open until the tube is collapsed to its initial diameter and partially refilled with explosive gas, at which point the valve in the vacuum line closes.

The opening and closing of the various valves may be controlled by the operation of the power valve or by the use of a separate control valve that controls the flow of an operating medium. The medium may be a fluid such as compressed air or hydraulic fluid. The control valve can be an electrically operated valve controlled by the firing circuits of the source.

BRIEF DESCRIPTION OF THE DRAWINGS

The present invention will be more easily understood from the following detailed description of preferred embodiments when taken in conjunction with the attached drawings in which.

DESCRIPTION OF A PREFERRED EMBODIMENT

Figure 1:
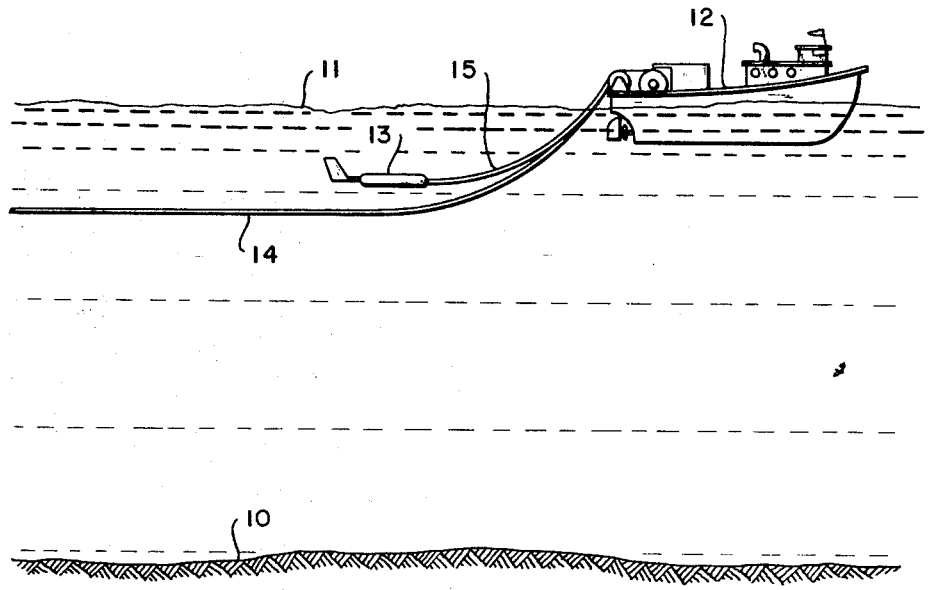
FIG. 1 is a view of the sound source constructed according to this invention as used in conducting a survey of a water-covered area.

Referring now to FIG. 1, there is shown a body of water 11 that overlays a bottom 10. A survey boat 12 tows a sound source 13 constructed according to this invention and a string of geophones 14. The sound source and geophones are coupled to the boat by means of towing cables 15 that also include the required electrical circuits for operating equipment and transmitting the geophone signals to the recording equipment on the survey boat. The survey boat also includes equipment for controlling the depth and operation of the sound source and exhausting the sound source after the gas mixture is exploded.

Figure 3:
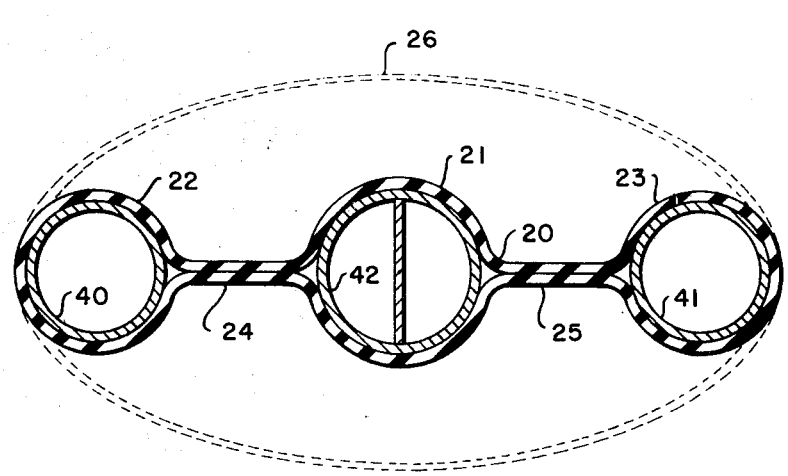
FIG. 3 is a cross section of the sound source shown in FIG. 2.
Figure 2:
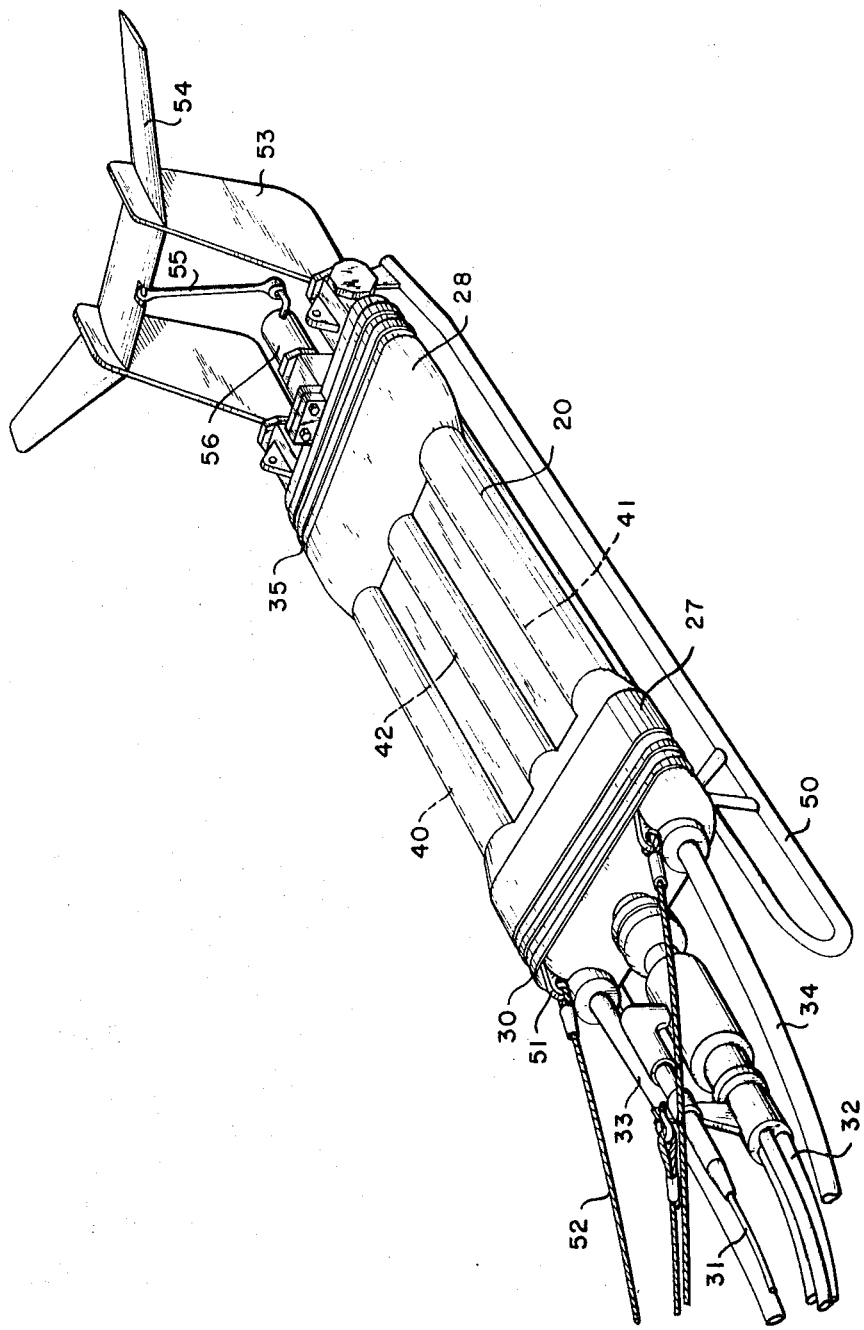
FIG. 2 is a perspective view of the sound source constructed according to this invention.

Referring now to FIG. 2, there is shown a perspective view of the detailed construction of the sound source shown in FIG. 1. The sound source comprises a flexible tube 20 shown in greater detail in FIG. 3. The flexible tube comprises a center tube 21 that forms the combustion chamber and two side tubes 22 and 23 which are joined to the center tube by means of the lateral walls 24 and 25. To insure that the flexible tube is not completely collapsed, metal tubes or pipes 40, 41 and 42 are inserted in the flexible tubular portions 21–23 of the flexible tube 20. The center tube 21 forms the combustion chamber, while the tube 40 forms an exhaust tube for exhausting the combustion products, as more fully explained below. Similarly, the tube 41 is a vacuum tube and is coupled to a vacuum source disposed on the boat to fully scavenge the combustion chamber as explained below. The flexible tubular member 20 is designed so that it may readily expand into an oval shape as shown by the dotted line 26 in FIG. 3. The tube should be designed so that the cross sectional area of the tube in expanded condition is approximately five to 10 times that of the cross sectional area of the collapsed tube. When considering the cross sectional area, it should be remembered that the area of the tubes 22 and 23 is not part of the volume of the flexible tube, since the exhaust and vacuum tubes 40 and 41 do not communicate with the interior of the flexible tube. Thus, in the collapsed state the flexible tube has a cross sectional area substantially equal to the cross sectional area of the center tube 21. The construction and operation of an explosive gas type sound source using a flexible tube that can freely expand is more fully described and explained in U.S. Pat. No. 3,176,787.

The ends of the flexible tube 20 are coupled to transition pieces 27 and 28, which in turn are coupled to the end pieces 30 and 35 of the sound source. The end piece 30 forms both the inlet and forward end of the sound source and has provisions for coupling the gas supply 31 through suitable valves to the interior combustion chamber 21. Similarly, the electrical leads 32 and leads for the control circuits are inserted through the center portion of the end piece 30. The exhaust tube 33 passes through the end piece and communicates with the exhaust tube 40 disposed in the flexible tube. In a similar manner, the tube 34 from the vacuum source passes through the end piece and communicates with the interior of the vacuum discharge line 41 disposed in the flexible tube.

The aft end of the flexible tube couples to the transition piece 28 that is connected to a valve housing 35. The valve housing contains valves to control the exhausting of the combustion products from the center combustion chamber 21 to the exhaust tube 40 and the vacuum tube 41. The construction and operation of the valves disposed in the valve housing 25 is more fully described below with relation to FIG. 4.

The sound source is provided with sled-like runners 50 in order that the source can contact the bottom of the water-covered area and be towed through the water without damaging the source. The source is also provided with suitable towing eyes 51 fixed to the head 30 in order that a towing cable or bridle 52 may be attached to the source. A pair of vertical fins 53 are provided at the aft end of the source to assist in towing the source in a straight line behind a towing vessel. Similarly, the source is provided with movable horizontal fins 54 that are actuated by means of a push rod 55 and a power cylinder 56. Horizontal fins 54 can be actuated to control the depth at which the source is towed. Of course, other means may be used to control the depth at which the source is towed; for example, buoyancy chambers and the like may be used. Also, the buoyancy of the source can be controlled to control the depth.

Figure 4:
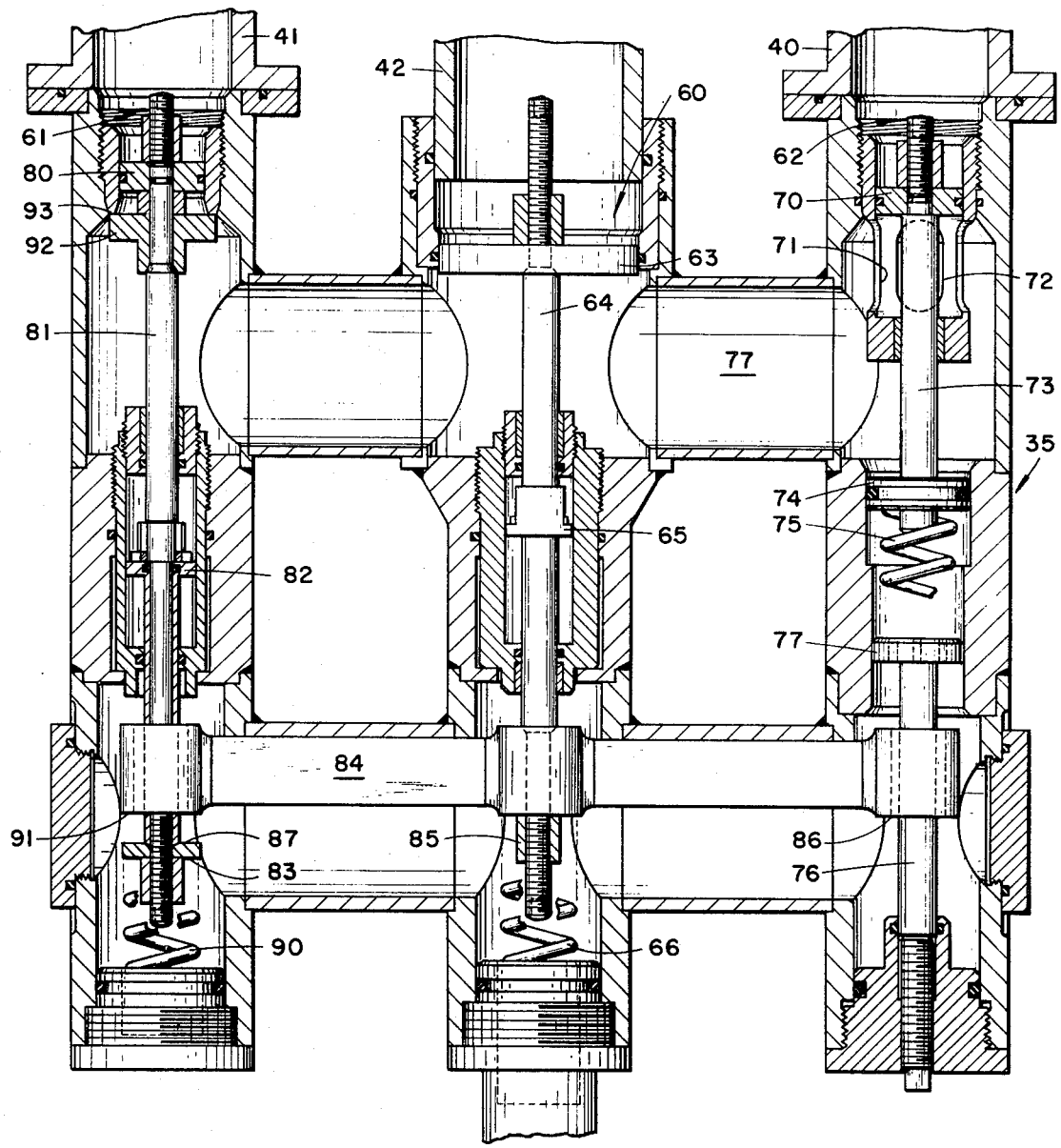
FIG. 4 is a cross sectional view of the manifold and valves used with the sound source shown in FIG. 2.

Referring now to FIG. 4, there is shown a cross section of the valve housing 35 shown in FIG. 2. The valve housing includes a central power valve 60 whose housing is attached to the aft end of the combustion tube 42. A vacuum valve 61 communicates with the vacuum tube 41, while an exhaust valve 62 is located on the right and coupled to the exhaust line 40. The end of the combustion tube 42 may extend axially into the power valve housing and be sealed therein by means of an O-ring in order that the valve housing 35 may move axially with relation to the combustion tube 42.

The vacuum tube 41 and exhaust tube 40 can be coupled directly to the flanges on the end of the exhaust and vacuum valves. Similarly, the opposite ends of the exhaust and vacuum tubes can be coupled to the head member 30 of the sound source. Thus, as the sound source expands and contracts, the combustion tube can move in the valve housing.

The power valve 60 utilizes a power piston 63 coupled to a piston shaft 64 that is supported in suitable bearings in the valve body. Positioned on the piston shaft 64 is a second piston 65 that is disposed in a cylinder formed in the valve body. The combination of a piston 65 and cylinder form a hydraulic damping means or dash pot which controls the speed of the opening and closing of the valves, as more fully explained below. A spring 66 is disposed at the lower end of the power valve piston rod to control the opening of the power valve. The force of the spring 66 can be varied to vary the pressure in the combustion chamber required to open the power valve. Thus, the power valve will remain open as long as the pressure in the combustion chamber acting on the piston 63 exceeds the force of spring 66. When the pressure falls below the required level, the valve will tend to close, but its closure will be delayed due to the dash pot formed by the piston 65 and the cylinder. This dash pot should be designed to permit relatively rapid opening of the exhaust valve, followed by relatively slow closing.

The exhaust valve 62 is also a piston type valve having a piston 70 that operates in a ported cylinder 71 having radial ports 72 formed therein. The piston 70 is coupled to a piston rod 73 whose lower end is attached to piston 74. Disposed below the piston 74 is a spring 75 which closes the exhaust valve when the pressure in the exhaust chamber 77 falls. It should be noted that the area of the piston 74 is greater than the area of the piston 70 and thus when the power valve opens, it releases the pressure of the combustion gases into the connecting exhaust chamber 77 and opens the exhaust valve. The exhaust valve will remain open until the pressure in the exhaust chamber 77 acting on the difference in area between pistons 74 and 70 is insufficient to overcome the force of the spring 75. The force of the spring 75 is adjusted by means of an adjusting screw 76 having a plate 77 disposed at one end. Thus, by movement of the screw 76, the force of the spring can be varied.

The opening of the exhaust chamber to the vacuum system is controlled by means of the vacuum valve 61. The vacuum valve is a piston type valve having a piston 80 that is connected to a piston rod 81 whose lower end is connected to a cross member 84. The center of cross member 84 is firmly attached to the piston rod 64 of the power valve while the right hand end provides a support for the adjusting screw of the exhaust valve. The vacuum valve also includes a dash pot 82 which is formed by means of a piston mounted on the piston rod 81 and a cylinder formed in the valve body. A spring 90 is disposed at the bottom of the vacuum valve and bears against a flange 83 secured to the lower end of the piston rod 81. The spring 90 holds the vacuum valve closed until the cross arm 84 contacts the upper surface 87 of the flange 83 to open the valve against the force of the spring 90. It should be noted that there is a space between the bottom surface 91 of the cross arm and the top surface 87 of the flange 83. This space can be varied to control the timing between the opening of the power valve 60 and the opening of the vacuum valve 61. A similar stop 92 is provided at the upper end of vacuum valve piston rod 81 and contacts the lower edge 93 of the valve body. This upper stop limits the upward travel of the vacuum valve, which travel can be varied by varying the spacing between the stop 92 and the piston 80.

OPERATION

The sound source described above and shown in FIGS. 1–4 is operated by first charging the combustion tube 42 with a combustible gas mixture. The charge may be introduced into the combustion tube through a suitable valve means that is controlled from the surface vessel 12, as more fully explained in the above-referenced patents. After the combustion chamber is filled with combustible gas, it is ignited by supplying a suitable potential to a spark means located in communication with the combustion tube. As the gas mixture is ignited it will burn and expand the flexible-walled tubular member 20 into a configuration substantially like the oval shape 26 shown in FIG. 3. As the gas mixture expands, the pressure will increase until it is sufficient to open the power valve 60. As explained, the valve 60 will open when the force created by the pressure on the top side of the piston 63 is sufficient to overcome the force of the spring 66 at the bottom of the valve. When the valve 60 opens, it will admit the combustion gases into the exhaust chamber 77 where they may react against the difference in areas between piston 70 and 74 and open the exhaust valve 62. When the exhaust valve opens, a major portion of the combustion products will be exhausted through the exhaust ports and the exhaust tube 40. The exhaust tube itself consists of a solid tubular conduit 40 disposed within the flexible tube. The exhaust gases are then conveyed to the surface through the exhaust tube 33 and discharged. When the power valve 60 opens, it will move the cross arm 84 downwardly until the surface 91 on the left hand portion contacts the upper surface 87 of the adjustable stop on the vacuum valve. When the two surfaces contact, the further movement of the power valve will open the vacuum valve and permit the vacuum system to complete the scavenging of the combustion products from the combustion chamber. As explained, the space between the surface 91 and the upper surface 87 of the stop of the vacuum valve can be adjusted to control the timing between the opening of the power valve and the opening of the vacuum valve. The delay should be sufficient to permit the major portion of the combustion products to be exhausted through the exhaust valve 62 and thus limit the quantity of gas that must be handled by the vacuum system. The vacuum valve is coupled by means of the tubular member 41 to the vacuum hose 34 which communicates with the vacuum system disposed on the vessel 12.

From the above description of the operation of the present invention, it is seen that the explosive gas mixture is introduced into the combustion chamber and ignited and then the combustion chamber opened to exhaust the combustion products therefrom. The major portion of the combustion products are exhausted through the exhaust valve 62, while the final scavenging of the exhaust products is completed by opening the vacuum valve 61. The combination of the cross arm 84 and flange 87 is designed so as to delay the opening of the vacuum port until after the exhaust portion has been opened and thus limit the quantity of the combustion products that must be handled by the vacuum system.

We claim as our invention:

1. A seismic source comprising:
   a closed chamber having flexible walls;
   a conduit means, said conduit means communicating with said closed chamber to introduce an explosive gas mixture therein;
   a detonating means, said detonating means being disposed to ignite the gas mixture in said closed chamber;
   evacuation means, said evacuation means communicating with said chamber to exhaust the detonation products from said chamber, the evacuation means including a conduit for venting the major part of the detonation products to atmosphere and vacuum means for scavaging the remainder of the detonation products;
   a flow control means, said flow control means being disposed to control the flow through said evacuation means; and
   control means, said control means being operably coupled to said flow control means to open said flow control means to evacuate said chamber after the gas is detonated and close said flow control means at least as soon as substantially all of the chamber's volume is refilled with said explosive gas.

2. A method for producing seismic impulses comprising:
   supplying an explosive gas mixture to a closed chamber having a flexible wall in contact with a body of water;
   detonating the explosive gas mixture within the chamber;
   after the outward flexing of the chamber wall has displaced the adjacent water, opening the chamber into a conduit;
   before the completion of the inward flexing of the chamber wall in response to the hydrostatic pressure of the liquid, opening the conduit into an evacuated container;
   supplying additional explosive gas mixture and closing the chamber at least as soon as substantially all of its volume is occupied by the explosive gas mixture; and
   closing the evacuated container and conduit before detonating the gas in the chamber.

3. A seismic source comprising:
   a closed chamber having flexible walls;
   a conduit means, said conduit means communicating with said closed chamber to introduce an explosive gas mixture therein;
   a detonating means, said detonating means being disposed to ignite the gas mixture in said closed chamber;
   an evacuation conduit, said evacuation conduit communicating with said chamber to exhaust the detonation products from said chamber;
   a flow control means, said flow control means being disposed to control the flow through said evacuation conduit;
   control means, said control means being operably coupled to said flow control means to open said flow control means to evacuate said chamber after the gas is detonated and close said flow control means at least as soon as substantially all of the chamber's volume is refilled with said explosive gas;
   an exhaust conduit, said exhaust conduit communicating with said chamber and the atmosphere;
   a second flow control means, said second flow control means being disposed to control flow through said exhaust conduit;
   a second control means, said second control means being operably coupled to said second flow control means to open said second flow control means in response to the arrival of the pressure wave created by the detonation of the gas mixture and close it before the flexible wall of the chamber has expanded to its maximum size.

4. The seismic source of claim 1 wherein said chamber is an elongated chamber and said conduit means communicates with one end and said evacuation conduit communicates with the other end.

5. A seismic source comprising:
   a closed elongated chamber having flexible walls;
   a conduit means, said conduit means communicating with one end of said closed chamber to introduce an explosive gas mixture therein;
   a detonating means, said detonating means being disposed to ignite the gas mixture in said closed chamber;
   an evacuation conduit, said evacuation conduit communicating with the other end of said chamber to exhaust the detonation products from said chamber;
   a flow control means, said flow control means being disposed to control the flow through said evacuation conduit; and
   control means, said control means being operably coupled to said flow control means to open said flow control means to evacuate said chamber after the gas is detonated and close said flow control means at least as soon as substantially all of the chamber's volume is refilled with said explosive gas, said control means comprising a power valve disposed to be operated by the arrival of the pressure wave created by the detonation of the explosive gas, and a vacuum valve said power valve being operably coupled to said vacuum valve to open said vacuum valve after a time delay.

6. In a gas exploder seismic waVe source including a closed chamber having flexible walls, means to supply an explosive mixture to said chamber, means to detonate said explosive mixture, thereby producing gaseous detonation products, and means to vent the detonation products to atmosphere, the improvements comprising: vacuum operated exhaust means including an evacuated conduit coupled to said chamber to further exhaust said detonation products from said chamber.

7. In a gas exploder seismic wave source including a closed chamber having flexible walls, means to supply an explosive mixture to said chamber and means to detonate said explosive mixture, thereby producing gaseous detonation products, the improvements comprising: vacuum operated exhause means coupled to said chamber to exhaust said detonation products from said chamber, said exhaust means including an evacuated container coupled to a vacuum source and a pressure responsive valve interposed between said chamber and said evacuated container.

8. In a gas exploder seismic wave source including a closed chamber having flexible walls, means to supply an explosive mixture to said chamber and means to detonate said explosive mixture, thereby producing gaseous detonation products, the improvements comprising: exhaust means coupled to said chamber to exhaust the major part of said detonation products from said chamber, and scavaging means including a vacuum conduit for removing the remainder of the detonation products from the chamber.

* * * * *